(12) United States Patent
Yang et al.

(10) Patent No.: US 11,876,871 B2
(45) Date of Patent: Jan. 16, 2024

(54) SYSTEMS AND METHODS FOR PROVIDING FIRMWARE OVER-THE-AIR UPDATES

(71) Applicant: Verizon Patent and Licensing Inc., Basking Ridge, NJ (US)

(72) Inventors: Jin Yang, Orinda, CA (US); Xin Wang, Morris Plains, NJ (US); Jitendra V. Patel, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/178,601

(22) Filed: Feb. 18, 2021

(65) Prior Publication Data

US 2022/0263915 A1 Aug. 18, 2022

(51) Int. Cl.
| | |
|---|---|
| *H04L 67/00* | (2022.01) |
| *H04W 16/28* | (2009.01) |
| *H04W 4/20* | (2018.01) |
| *G16Y 40/40* | (2020.01) |

(52) U.S. Cl.
CPC ............... *H04L 67/34* (2013.01); *H04W 4/20* (2013.01); *H04W 16/28* (2013.01); *G16Y 40/40* (2020.01)

(58) Field of Classification Search
CPC ........ H04L 67/34; H04W 4/20; H04W 16/28; G16Y 40/40
See application file for complete search history.

(56) References Cited

U.S. PATENT DOCUMENTS

| | | | | |
|---|---|---|---|---|
| 7,027,773 | B1* | 4/2006 | McMillin | H04L 45/00 455/445 |
| 9,756,549 | B2* | 9/2017 | Perdomo | H04W 12/08 |
| 9,904,535 | B2* | 2/2018 | Gross | G01R 31/44 |
| 10,966,306 | B1* | 3/2021 | Recker | H02J 13/00006 |
| 2004/0090950 | A1* | 5/2004 | Lauber | H04Q 9/00 370/352 |
| 2004/0204110 | A1* | 10/2004 | Davidson | H04B 7/0408 455/562.1 |
| 2009/0063187 | A1* | 3/2009 | Johnson | H04L 67/30 705/2 |
| 2009/0063193 | A1* | 3/2009 | Barton | A61B 5/349 340/539.11 |
| 2012/0094643 | A1* | 4/2012 | Brisebois | H04W 92/12 455/418 |
| 2018/0027604 | A1* | 1/2018 | Haag | H04W 4/021 455/553.1 |

(Continued)

FOREIGN PATENT DOCUMENTS

| | | | | |
|---|---|---|---|---|
| DE | 112018007704 T5 * | 3/2021 | ........... | H05K 7/1422 |
| DE | 112019002913 T5 * | 3/2021 | .............. | H04W 4/40 |
| WO | WO-2019234385 A1 * | 12/2019 | .............. | H04W 4/20 |

*Primary Examiner* — Thu V Nguyen
*Assistant Examiner* — Angela M Widhalm De Rodriguez

(57) ABSTRACT

Systems and methods described herein provide for receiving, by a network device and from a radio access network (RAN) controller, transmission information related to performing an over-the-air (OTA) update campaign, the transmission information identifying a location of a plurality of user equipment (UE) devices that are to receive an OTA update; receiving, by the network device, an OTA update file associated with the OTA update; and transferring, by the network device, the OTA update file to the plurality of UE devices according to the transmission information.

20 Claims, 6 Drawing Sheets

(56) References Cited

U.S. PATENT DOCUMENTS

| | | | |
|---|---|---|---|
| 2018/0041982 A1* | 2/2018 | Mulaosmanovic | G01S 19/34 |
| 2018/0166787 A1* | 6/2018 | Johnson | H04B 7/0617 |
| 2018/0351605 A1* | 12/2018 | Liang | H04B 7/0617 |
| 2019/0131718 A1* | 5/2019 | Vannucci | H01Q 21/065 |
| 2019/0132414 A1* | 5/2019 | Bongaarts | G06V 20/40 |
| 2019/0187971 A1* | 6/2019 | Wang | H04W 12/04 |
| 2020/0259896 A1* | 8/2020 | Sachs | G06K 19/06028 |
| 2020/0296765 A1* | 9/2020 | Kim | H04W 74/006 |
| 2020/0367147 A1* | 11/2020 | Hoglund | H04W 48/16 |
| 2021/0218825 A1* | 7/2021 | Sharma | H04L 41/0893 |

\* cited by examiner

SYSTEMS AND METHODS FOR PROVIDING FIRMWARE OVER-THE-AIR UPDATES

BACKGROUND INFORMATION

To address the evolving demands of users of mobile communication devices, wireless communication providers continue to improve and expand available services, as well as networks used to deliver the services. One such improvement includes the development of wireless access networks as well as options for utilizing such wireless access networks. A wireless access network operator may manage a large number of end devices using varied services in dynamic radio connectivity conditions throughout a service coverage area. Network access and service administration for a large number of devices on a same network may pose various challenges.

DETAILED DESCRIPTION

Figure 1:
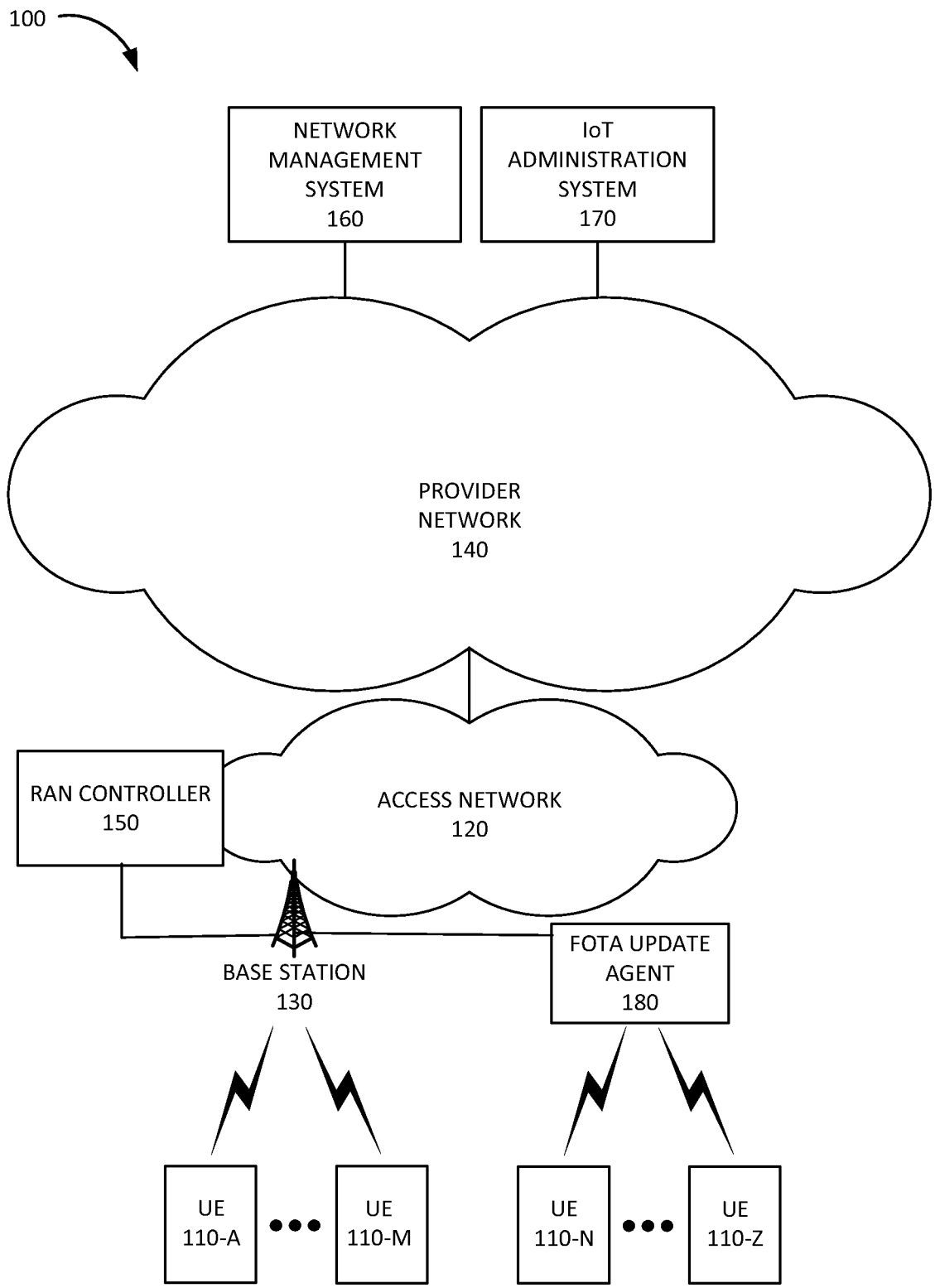
FIG. 1 is a diagram illustrating an environment according to an implementation described herein.

The following detailed description refers to the accompanying drawings. The same reference numbers in different drawings identify the same or similar elements. Also, the following detailed description does not limit the invention.

Wireless access networks traditionally designed to support mobile devices, such as smart phones, are increasingly being used to also support Internet of things (IoT) applications. This has led to a growing presence of IoT devices employing machine-to-machine (M2M) communications, such as machine-type communications (MTC). MTC may allow communication among IoT devices without requiring direct user interaction. IoT applications enable a wide variety of implementations, ranging from fixed installations of utility meters, environmental sensors, parking meters, and/or occupancy sensors, security sensors, smart lighting, traffic cameras, advertising displays, point-of-sale terminals, vending machines, remote diagnostics devices, power grid sensors and/or management devices, and the like, to mobility trackers, high-velocity autonomous vehicles and aerial drones. IoT usage is expected to increase exponentially and may result in an inestimable number of IoT devices being serviced by a single wireless access network. Network infrastructures may support an increase in the number of IoT devices within a wireless operator's network to millions of devices communicating with each other autonomously with little-to-no user intervention. Thus, provisioning of wireless communications may involve managing wireless access networks that service a massive number of IoT devices.

A wireless network, such as a Fourth Generation (4G) Long Term Evolution (LTE) access network (e.g., an evolved packet core (EPC) network), may use the Evolved Universal Terrestrial Radio Access (E-UTRA) air interface to wirelessly communicate with devices. The bandwidth of an E-UTRA channel in an LTE band may range from about 1.4 to about 20 megahertz (MHz). In many applications, the data sent/received by IoT devices may be small compared to other types of devices, such as mobile phones used for voice traffic or for streaming content. Furthermore, many IoT devices are designed for low power applications and extended battery life. Therefore, use of large bandwidth channels that use considerable amounts of power—such as an LTE channel—for wirelessly communicating with IoT devices, results in an inefficient use of radio link and device resources.

A technology developed for IoT applications that requires substantially less data and that is based on a low power wide area network (LPWAN) design is LTE Category M1 (CAT-M1). CAT-M1 channels, also sometimes referred to as enhanced MTC (eMTC) channels, use a total bandwidth of 1.4 MHz and have a comparably low power requirement to that of an LTE channel. Another technology, developed for IoT applications, which requires significantly less data and/or power, is narrow band (NB) IoT (NB-IoT) technology. NB-IoT is an LPWAN technology that uses 200 Kilohertz (KHz) channels, with their own guard bands, for sending small bursts of data. The use of NB-IoT channels may result in better signal penetration in hard-to-reach, poor radio frequency (RF) coverage areas, such as areas likely to be occupied by IoT devices (e.g., a utility meter installed in a location that shadows or fades wireless signals). Furthermore, the use of NB-IoT channels may result in minimal energy consumption and/or reduced component cost. Other types of wireless networks, such as Fifth Generation (5G) and beyond may also support IoT applications and associated data transfers and power considerations.

The firmware of an IoT device may control the low-level operation of its hardware and its lifecycle management may include periodic upgrading and/or on-demand updating of the firmware. The scale of such upgrades may involve a massive number of IoT devices deployed on the same network, or even attached to the same base station, receiving a sizable amount of data within a relatively short and preferably uninterrupted timeframe. For example, an entity managing a fleet of IoT devices may initiate a wireless update campaign, also referred to as an over-the-air (OTA) update. One particular type of OTA update that may involve the sustained transfer of a large file may be a firmware OTA (FOTA) update. Other types of OTA updates that may include the transfer of a large file may be a baseband OTA update or an application software OTA update.

The number of concurrent successful attachments of CAT-M1 and/or NB-IoT devices to a particular base station, or to the number of simultaneous downloads of a FOTA update file via the particular base station, may be limited. The typically lengthy download times associated with FOTA updates may be exponentially longer—and sometimes altogether impossible—at locations such as extended RF coverage areas with extremely poor RF connectivity conditions (e.g., low signal-to-interference-noise-ratio (SINR), low reference signals received power (RSRP), etc.). RF link signaling overhead is further increased by interruptions to FOTA update downloads and the need to restart a FOTA update download from the beginning. Thus, when an original equipment manufacturer (OEM), or another enterprise that manages a large number of deployed IoT devices, decides to add a new functionality to, or fix a potential security flaw in, the IoT devices, the resources of a base station may be strained and susceptible to RF link failure. Current approaches to resolving the identified issues associated with FOTA updates, such as FOTA update file fragmentation and batch updating of target IoT devices, may not always be the best solution.

Implementations described herein relate to OTA updating of target user equipment (UE) devices, such as CAT-M1 devices and/or NB-IoT devices. A FOTA agent may be configured to provide a real-time and/or scheduled service to coordinate FOTA updates, and/or other types of OTA updates that may include a large file transfer, to a set of UE devices without overloading a serving base station's resources. The FOTA agent may be configured to—responsive to a triggering event—initiate FOTA activity based on information identifying a location within a radio access network (RAN) of target UE devices for the FOTA update; identify a closest of one or more base stations and/or sectors serving the UE devices; and direct FOTA update file transfers based on RAN controller information pertaining to beam transmission characteristics such as spectrum, direction, and/or power, as well as time of delivery.

Functions of the FOTA agent may be implemented using existing base stations and/or dedicated FOTA components. For example, the FOTA agent may reside in a network provider's public land mobile network (PLMN) and may be backhauled to the network provider's core network (e.g., an EPC, a 5G core network, etc.). In other implementations, the FOTA agent may be located at a multi-access edge computing (MEC) network. The FOTA agent may include a transceiver device that is capable of transmitting a directional antenna pattern and/or narrow or fine antenna beam patterns of a particular power range and spectrum toward target IoT UE devices while minimalizing interference to other UE devices serviced by a cell associated with an antenna array wireless transceiver. A narrow or sharpened antenna beam may be associated with higher antenna gain and finer spatial granularity, resulting in improved RF link quality and/or higher capacity.

In some implementations, the FOTA agent may include a portable device such as a small cell (e.g., femtocell). For example, the FOTA agent may be implemented as a "truck roll" that is capable of relocating to physical locations of target IoT UE devices deployed in service coverage areas having poor and/or extremely poor RF profiles. As such, implementations described herein may provide coverage extension for a serving base station. For example, the FOTA agent may provide CAT-M1 and/or NB-IoT air interface toward the target IoT UE devices. In this manner, the FOTA updates may be performed without physically accessing a customer's premises.

In other implementations, a RAN controller may determine network resource availability for a particular base station pertaining a FOTA update campaign. In one implementation, the RAN controller may determine a number of existing physical resource blocks (PRBs) and/or radio resource control (RRC) connections with respect to a time of delivery for the FOTA update. Based on the network resource availability, the RAN controller may determine network loading conditions (e.g., percentage of PRB utilizations, etc.). In some implementations, the RAN controller may obtain local RF conditions for each set of IoT UE devices (e.g., SINR, RSRP, etc.). In implementations described herein, the RAN controller may schedule FOTA update activity based on the network loading conditions and/or local RF conditions with respect to the size of the FOTA update file. In still other implementations, the RAN controller may instruct the FOTA agent and/or the serving base station to deliver the FOTA update file to the target IoT UE devices in accordance with transmission parameters related to various antenna beam characteristics for generating instructions for configuring an antenna beam pattern, beamforming gain, RF link quality, time of delivery, etc.

The FOTA agent may maintain a database of base stations and attached IoT UE devices. For example, when a IoT UE device initially attaches to a base station, the FOTA agent may receive an indication from the base station that a new IoT UE device has attached to the base station and index the new UE device with the database.

FIG. 1 illustrates an exemplary environment 100 in which the systems and/or methods, described herein, may be implemented. As shown in FIG. 1, environment 100 may include user equipment (UE) devices 110-A to 110-M and 110-N to110-Z (referred to herein collectively as "UE devices 110" and individually as "UE device 110"), an access network 120, a provider network 140, a RAN controller 150, a network management system 160, an IoT administration system 170, and a FOTA update agent 180.

UE device 110 may include any device with long-range (e.g., cellular or mobile wireless network) wireless communication functionality. For example, UE device 110 may communicate using M2M communication, such as MTC. For example, UE device 110 may include a utility meter (e.g., electricity meter, water meter, gas meter, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a digital signage display driver (e.g., an electronic billboard, etc.), a device performing manufacturing processes (e.g., a robot arm, an assembly line, etc.), a device for security monitoring (e.g., a camera, a motion sensor, a window sensor, etc.), a device controlling a power system (e.g., a smart grid monitoring device, a utility meter, a fault diagnostics device, etc.), a device for conducting consumer transactions (e.g., a point-of-sale terminal, a vending machine, a parking meter, etc.), health monitoring devices (e.g., a blood pressure monitoring device, a blood glucose monitoring device, etc.), and/or another type of electronic device.

In other implementations, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface.

Access network 120 may provide access to provider network 140 for UE devices 110. Access network 120 may enable UE devices 110 to connect to provider network 140 for mobile telephone service, Short Message Service (SMS) messaging service, Multimedia Message Service (MMS) message service, Internet access, cloud computing, and/or other types of data services.

Access network 120 may establish a packet data network (PDN) connection between UE device 110 and provider network 140 via one or more access points (APs). For example, access network 120 may establish an Internet Protocol (IP) connection between UE device 110 and provider network 140. Furthermore, access network 120 may enable UE device 110 to communicate with an application server, and/or another type of device, located in provider network 140 using a communication method that does not require the establishment of an IP connection between UE device 110 and provider network 140 through a gateway, such as, for example, Data over Non-Access Stratum (Do-NAS) communication method.

In some implementations, access network 120 may include a Long-Term Evolution (LTE) access network. In other implementations, access network 120 may include a Code Division Multiple Access (CDMA) access network. For example, the CDMA access network may include a CDMA enhanced High Rate Packet Data (eHRPD) access network (which may provide access to an LTE access network). Access network 120 may be a PLMN.

Additionally, access network 120 may include an LTE Advanced (LTE-A) access network and/or a 5G access network or other advanced access network that includes functionality such as 5G New Radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; self-organizing network (SON) functionality; MTC functionality, such as CAT-M1 and/or NB-IoT technology, and/or other types of MTC technology; and/or other types of LTE-A and/or 5G functionality.

As described herein, access network 120 may include base stations 130 (referred to herein individually as "base station 130"). Each base station 130 may service a set of UE devices 110. For example, base station 130 may service UE devices 110-A to 110-M. In other words, UE devices 110-A to 110-M may be located within the geographic area serviced by base station 130, and UE devices 110-A to 110-M may be attached to base station 130. Base station 130 may include a 4G LTE base station (e.g., an eNodeB) and/or a Fifth Generation (5G) New Radio (NR) base station (e.g., a gNodeB). Base station 130 may include one or more RF transceivers (also referred to as "cells" and/or "base station sectors") facing particular directions. For example, base station 130 may include three RF transceivers and each RF transceiver may service a 120° sector of a 360° field of view. Sectors of other sizes are possible. Base station 130 may also provide sub-sector coverage.

Access network 120 may include LTE EPC network elements, such as a Mobility Management Entity (MME), a Serving Gateway (SGW), a PDN Gateway (PGW), a Home Subscriber Server (HSS), a Policy and Charging Rules Function (PCRF), and/or other EPC network elements. In other implementations, access network 120 may include a 5G Standalone (SA) architecture that includes 5G network functions such as an Access and Mobility Function (AMF), a User Plane Function (UPF), a Session Management Function (SMF), an Application Function (AF), a Unified Data Management (UDM), a Policy Control Function (PCF), a Network Repository Function (NRF), a Network Exposure Function (NEF), a Network Slice Selection Function (NSSF), and/or other 5G SA network elements. Also, the 5G SA network may be configured to implement network slicing.

Provider network 140 may include, and/or be connected to and enable communication with, a local area network (LAN), a wide area network (WAN), a metropolitan area network (MAN), an optical network, a cable TV network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of provider network 140 may be managed by a provider of communication services that also manages access network 120 and/or UE device 110. Provider network 140 may allow the delivery of Internet Protocol (IP) services to UE device 110, and may interface with other external networks. Provider network 140 may include one or more server devices and/or network devices, or other types of computation or communication devices. In some implementations, provider network 140 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

RAN controller 150 may include one or more computer devices configured to control and/or coordinate FOTA update activity, and/or other types of updates to IoT devices, such as UE devices 110. For example, RAN controller 150 may receive an update (e.g., one or more update files) from IoT administration system 170 and may generate instructions to base station 130 and/or FOTA update agent 180 for delivering the update to UE device 110 in response to UE device 110 sending a message to RAN controller 150 having RF conditions and location information. The instructions may include transmission parameters as further described herein.

Network management system 160 may include one or more computer devices, such as server devices, which are configured to manage access network 120 and/or provider network 140. For example, network management system 160 may maintain information relating to the network capacity associated with particular base stations 130, such as the number of FOTA updates a particular base station 130 is able to deliver during a particular timeframe. Network capacity information may include PRB utilization percentages and/or number of RRC connections, and the sort, as further described herein.

IoT administration system 170 may include one or more computer devices, such as server devices, which are configured to manage a set of IoT devices. For example, IoT administration system 170 may generate a FOTA update campaign for a set of IoT UE devices 110. IoT administration system 170 may provide one or more update files relating to the FOTA update to RAN controller 150 and may provide FOTA update-related information to target UE devices 110. The FOTA update campaign information may include information identifying the file size associated with the FOTA update and information identifying target UE devices 110 that are to receive the FOTA update.

FOTA update agent 180 may include one or more network devices, such as a transceiver device, configured to enable a FOTA update associated with a FOTA update campaign, and/or another type of OTA update associated with a large file (e.g., a file larger than a threshold size). For example, FOTA update agent 180 may receive, from RAN controller 150, instructions to perform a FOTA update file transfer according to transmission parameters with respect to, for example, an antenna tilt setting, a transmit power, an antenna azimuth, an antenna beam width, a downlink or uplink band selection, as well as a time of delivery, as further described herein. According to some exemplary embodiments, FOTA update agent 180 may be a network device dedicated for OTA updates. Additionally, or alternatively, FOTA update agent 180 may be activated/deactivated in accordance with such dedicated usage.

According to some exemplary embodiments, FOTA update agent 180 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, FOTA update agent 180 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Although FOTA update agent 180 is illustrated as a standalone device, according to other exemplary embodiments, base station 130 may include FOTA update agent 180.

In some implementations, base stations 130 and/or FOTA agents 180 may include a beamforming system capable of performing beamforming on antenna array to generate an antenna beam based on a particular antenna beam pattern. For example, the beamforming system may set the phase of particular antenna elements in a particular sequence to generate the particular antenna beam pattern, and/or determine the size and shape of the subset of antenna array required to generate the particular antenna beam pattern.

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
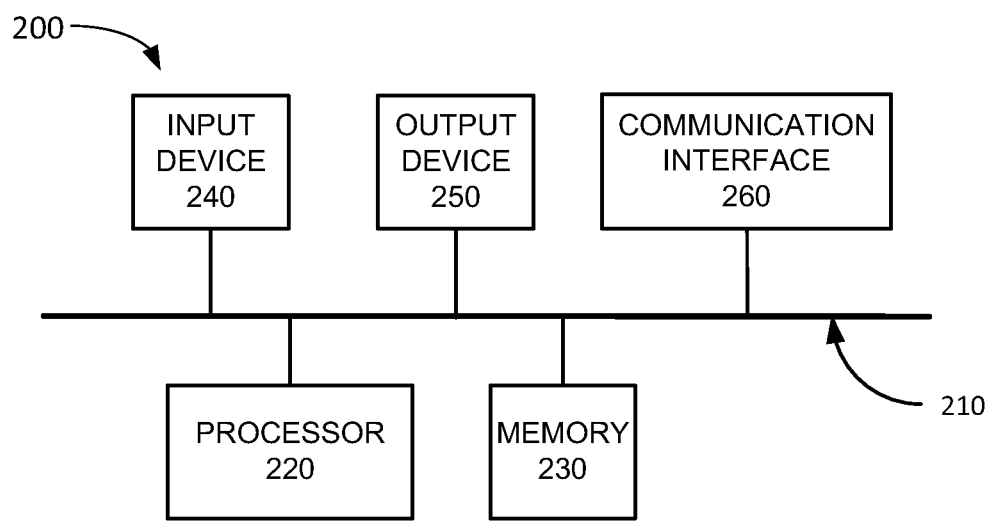
FIG. 2 is a diagram illustrating exemplary components of a device that may be included in a component of FIG. 1 according to an implementation described herein.

FIG. 2 is a diagram illustrating example components of a device 200 according to an implementation described herein. UE device 110, base station 130, RAN controller 150, network management system 160, IoT administration system 170, and FOTA update agent 180 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, output device 250 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to one or more antennas/antenna arrays for transmitting and receiving RF signals.

Communication interface 260 may include input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi, LTE, LTE-A, 5G air interface, etc.) card for wireless communications. Communication interface 260 may also include a universal serial bus (USB) port for communications over a cable, a Bluetooth™ wireless interface, a radio frequency identification (RFID) interface, a near-field communications (NFC) wireless interface, and/or any other type of interface that converts data from one form to another form.

As will be described in detail below, device 200 may perform certain operations relating to orchestrating a FOTA update campaign. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
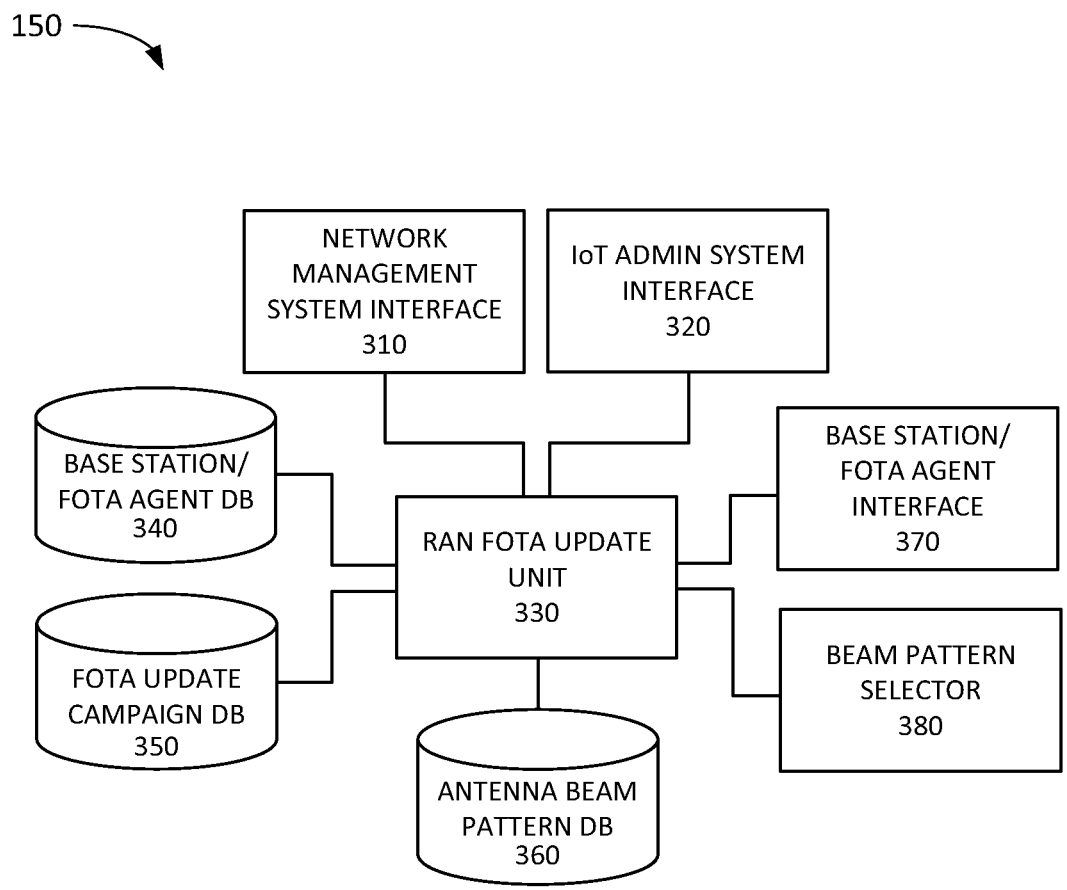
FIG. 3 is a diagram illustrating exemplary components of the radio access network (RAN) controller of FIG. 1 according to an implementation described herein.

FIG. 3 is a diagram illustrating exemplary components of RAN controller 150. The components of RAN controller 150 may be implemented, for example, via processor 220 executing instructions from memory 230. Alternatively, some or all of the functional components of RAN controller 150 may be implemented via hard-wired circuitry. As shown in FIG. 3, RAN controller 150 may include a network management system interface 310, an IoT administration (admin) system interface 320, a RAN FOTA update unit 330, a base station/FOTA agent database (DB) 340, a FOTA update campaign DB 350, an antenna bean pattern DB 360, a base station/FOTA agent interface 370, and a beam pattern selector 380.

Network management system interface 310 may be configured to communicate with network management system 160. For example, network management system interface 310 may receive information relating to network capacity of base stations 130 from network management system 160. IoT administration system interface 320 may be configured to communicate with IoT administration system 170. For example, IoT administration system interface 320 may receive information relating to a FOTA update campaign or other types of OTA updates from IoT administration system 170.

RAN FOTA update unit 330 may orchestrate a FOTA update campaign based on information stored in base station/FOTA agent DB 340 and FOTA update campaign DB 350; may generate antenna beam patterns based on the information; and may store antenna beam patterns related to the orchestrated FOTA update campaign in antenna beam patterns DB 360. Base station/FOTA agent DB 340 may store information relating to base stations 130. Exemplary information that may be stored in base station/FOTA agent DB 340 is described below with reference to FIG. 4. FOTA update campaign DB 350 may store information relating to FOTA update campaigns. Exemplary information that may be stored in FOTA update campaign DB 350 is described below with reference to FIG. 5. Antenna beam pattern DB 360 may store information related to antenna beam patterns generated by RAN FOTA update unit 330. Exemplary information that may be stored in antenna beam pattern DB 350 is described below with reference to FIG. 6.

Base station/FOTA agent interface 370 may be configured to communicate with base stations 130 and/or FOTA agents 180. For example, RAN FOTA update unit 330 may use base station/FOTA agent interface 370 to forward a FOTA update file to particular UE devices 110, via particular base stations 130 and/or FOTA agents 180, received from IoT administration system 170. RAN FOTA update unit 330 may further receive, via base station/FOTA agent interface 370, messages from particular UE devices 110 indicating that a FOTA update was performed successfully.

Beam pattern selector 380 may select a particular beam pattern for an antenna array for an antenna beam associated with a particular UE device 110 based on information stored in base station/FOTA agent DB 340, information stored in FOTA update campaign DB 350, and information stored in antenna beam pattern DB 360. Antenna beam pattern DB 360 may store information relating to particular antenna beam patterns. A particular antenna beam pattern may be defined by a set of parameters that specify the width of an antenna beam in particular directions (e.g., a horizontal width, a vertical width, etc.). Additionally, the particular antenna beam pattern may specify a particular power level setting.

Although FIG. 3 shows exemplary components of RAN controller 150, in other implementations, RAN controller 150 may include fewer components, different components, differently arranged components, or additional components than depicted in FIG. 3. Additionally, or alternatively, one or more components of RAN controller 150 may perform functions described as being performed by one or more other components of RAN controller 150.

Figure 4:
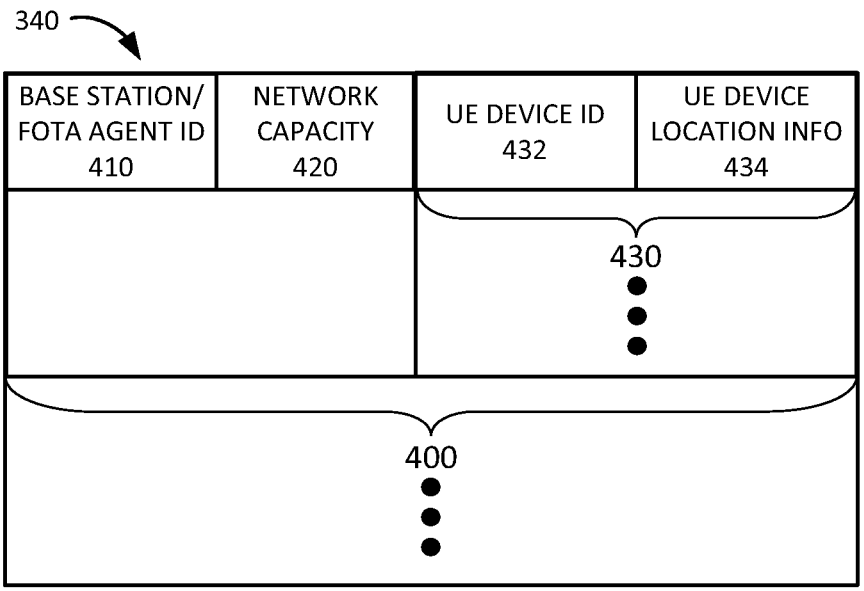
FIG. 4 is a diagram illustrating exemplary components of the base station/FOTA agent database of FIG. 3 according to an implementation described herein.

FIG. 4 illustrates exemplary information stored in base station/FOTA agent DB 340 according to an implementation described herein. As shown in FIG. 4, base station/FOTA agent DB 340 may include one or more base station/FOTA agent records 400. Each base station/FOTA agent record 400 may store information relating to a particular base station cell or sector and/or a dedicated FOTA transceiver. Base station/FOTA agent record 400 may include a base station identifier/FOTA agent (ID) field 410, a network capacity field 420, and one or more UE device records 430.

Base station/FOTA agent ID field 410 may store an ID associated with a particular base station 130 and/or FOTA update agent 180. Network capacity field 420 may store information identifying a network capacity associated with the particular base station 130 and/or FOTA update agent 180. As an example, network capacity field 420 may store information indicating the number of simultaneous CAT-M1 and/or NB-IoT attachments (e.g., RRC connections, PRBs, etc.) that each base station 130 and/or FOTA update agent 180 is able to satisfy the RF signal quality requirements for an identified timeframe. As another example, network capacity field 420 may store information indicating the number of OTA updates, such as FOTA updates, baseband OTA updates, and/or application software OTA updates, that each base station 130 and/or FOTA update agent 180 is able to satisfy the RF signal quality requirements for an identified timeframe. As another example, network capacity field 420 may store information indicating the number of OTA updates involving a particular file size (e.g., over 1 Megabyte, etc.) that each base station 130 and/or FOTA update agent 180 is able to satisfy the RF signal quality requirements for the particular timeframe. As a further example, network capacity field 420 may indicate the throughput that the particular base station 130 is able to satisfy the RF signal quality requirements for CAT-M1 and/or NB-IoT UE devices 110 for an identified timeframe.

Each UE device record 430 may store information relating to each UE device 110 that is a target of a FOTA update campaign. UE device record 430 may include a UE device ID field 432 and a UE device location information (info) field 434. UE device ID field 432 may store one or more IDs identifying each UE device 110 associated with the FOTA update campaign. For example, UE device ID field 432 may store an International Mobile Equipment Identity (IMEI) ID, an Electronic Serial Number (ESN) ID, an International Mobile Subscriber Identity (IMSI) ID, a Mobile Directory Number (MDN) ID, a Mobile Station International Subscriber Directory Number (MSISDN) ID, a Globally Unique Temporary Identity (GUTI) ID, a Cell Radio Network Temporary Identity (CRTNI) ID, an IP address, a Media Access Control (MAC) address, and/or another type of identifier associated with each target UE device 110. UE device location info field 434 may store location information, for each target UE device 110, which indicates a physical location of each target UE device 110. For example, the location information may include a physical address, geographic coordinates or other positioning information. UE device records 430 may be updated corresponding to location changes and/or operational mode changes for each target UE device 110.

Although FIG. 4 shows exemplary components of base station/FOTA agent ID DB 340, in other implementations, base station/FOTA agent DB 340 may include fewer components, different components, additional components, or differently arranged components than depicted in FIG. 4.

Figure 5:
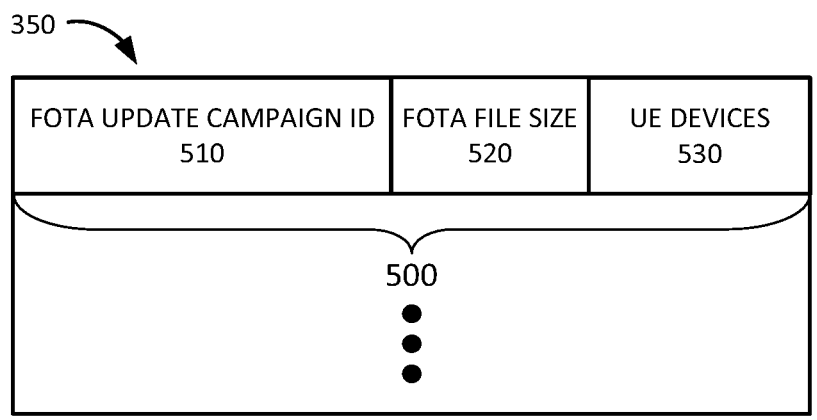
FIG. 5 is a diagram illustrating exemplary components of the FOTA update campaign database of FIG. 3 according to an implementation described herein.

FIG. 5 is a diagram illustrating exemplary components stored in FOTA update campaign ID DB 350 according to an implementation described herein. As shown in FIG. 5, FOTA update campaign record 500 may include a FOTA update campaign ID field 510, a FOTA file size field 520, and a UE devices field 530. FOTA update campaign ID field 510 may store an ID associated with a corresponding FOTA update campaign identified by IoT administration system 170. FOTA file size field 520 may store information indicating the size of a file for a FOTA update associated with the corresponding FOTA update campaign. UE devices field 530 may store information identifying a set of target UE devices 110 for the FOTA update. For example, UE devices field 530 may store a particular type of UE device ID that is stored in base station/FOTA agent DB 340, as described above with reference to FIG. 4.

Although FIG. 5 shows exemplary components of FOTA update campaign ID DB 350, in other implementations, FOTA update campaign ID DB 350 may include fewer components, different components, additional components, or differently arranged components than depicted in FIG. 5.

Figure 6:
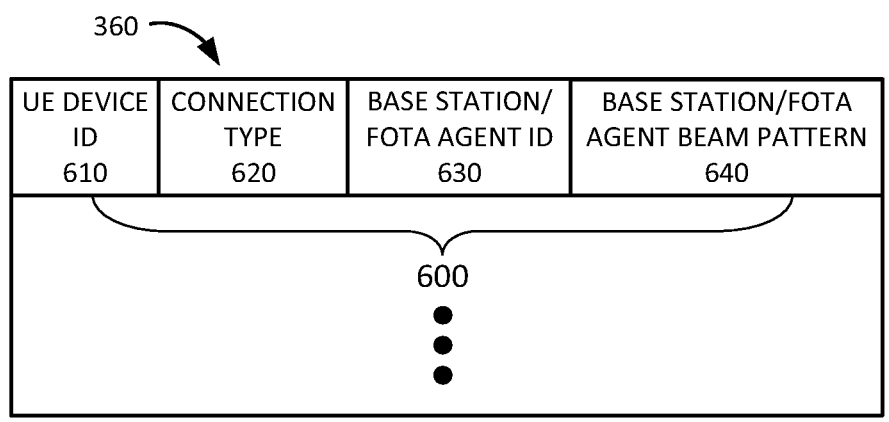
FIG. 6 is a diagram illustrating exemplary components of the antenna beam pattern DB of FIG. 3 according to an implementation described herein.

FIG. 6 is a diagram illustrating exemplary components of the antenna beam pattern DB 360 according to an implementation described herein. As shown in FIG. 6, each antenna beam pattern record 600 may store a UE device ID field 610, a connection type field 620, a base station/FOTA agent ID field 630, and a base station/FOTA agent beam pattern 640.

UE device ID field 610 may store a particular type of UE device ID that is stored in base station/FOTA agent DB 340 as described above with reference to FIG. 4. Connection type field 620 may store information identifying a connection type associated with each target UE device. For example, connection type field 520 may identify an applicable quality of service (QoS) class associated with a connection, a particular service requirement associated with the connection (e.g., a latency requirement, a throughput requirement, etc.), and/or other types of information identifying a type and/or parameter of a radio connection. Connection type field 520 may identify whether UE device 100 is a CAT-M1 and/or an NB-IoT device. Base station/FOTA agent ID field 630 may store a particular type of base station/FOTA agent ID that is stored in base station/FOTA agent DB 340 as described above with reference to FIG. 4. Base station/FOTA agent beam pattern field 640 may store an identified beam pattern for an antenna array of base station 130 and/or FOTA update agent 180, that was selected by beam pattern selector from antenna beam pattern DB 360 for the target set of UE devices 110. The identified beam pattern may include data pertaining to an antenna tilt setting, a transmit power, an antenna azimuth, an antenna beam width, a downlink or uplink band selection or other data.

Although FIG. 6 shows exemplary components of antenna beam pattern DB 360, in other implementations, antenna beam pattern DB 360 may include fewer components, different components, additional components, or differently arranged components than depicted in FIG. 6.

Figure 7:
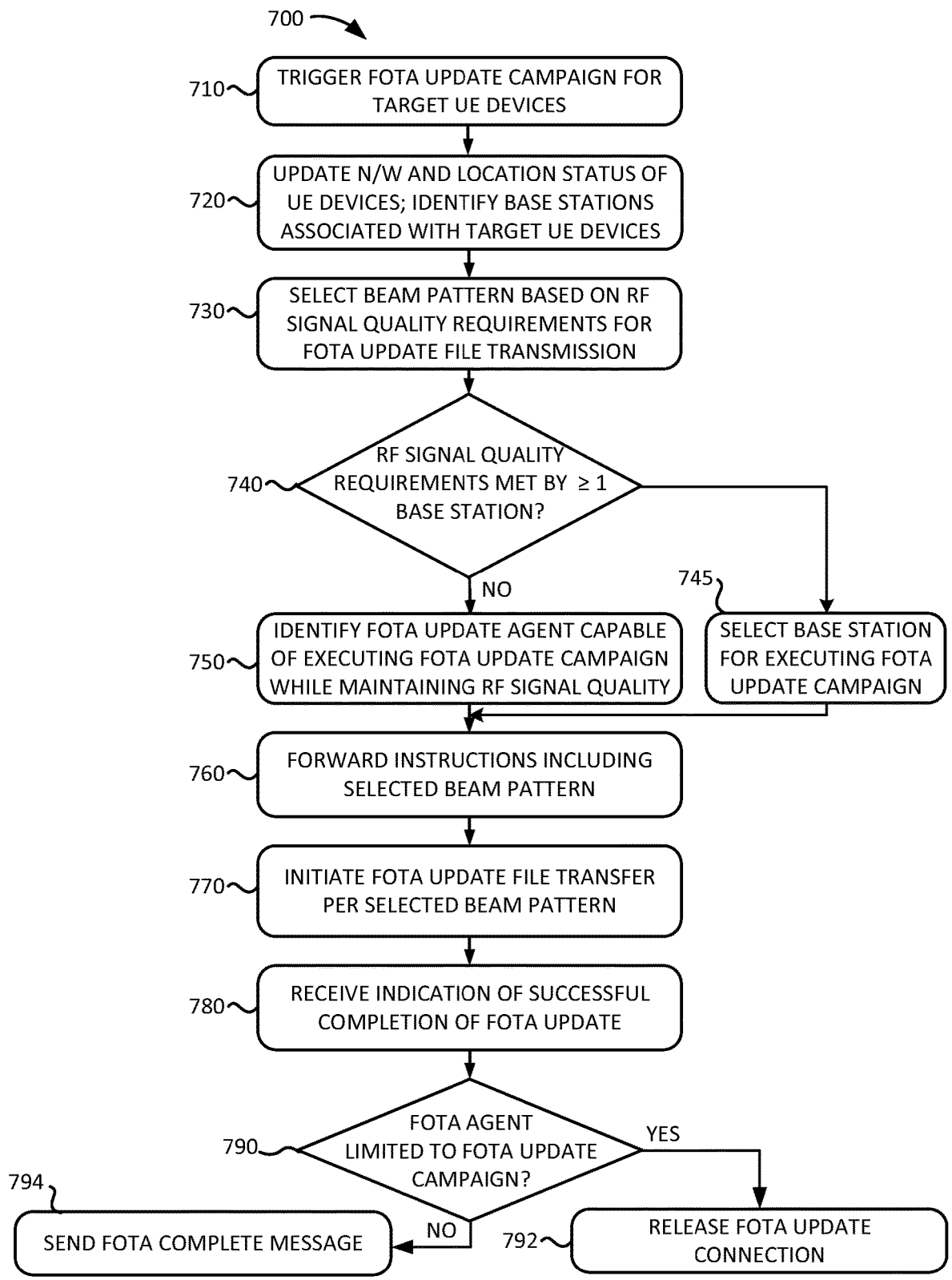
FIG. 7 is a flowchart of a process for executing a FOTA update campaign according to an implementation described herein.

FIG. 7 is a flowchart of a process for executing a FOTA update campaign according to an implementation described herein. In some implementations, the process of FIG. 7 may be performed by UE device 110, base station 130, RAN controller 150, network management system 160, IoT administration system 170, and/or FOTA update agent 180. In other implementations, some or all of the process of FIG. 7 may be performed by another device or a group of devices separate from UE device 110, base station 130, RAN controller 150, network management system 160, IoT administration system 170, and/or FOTA update agent 180.

The process of flowchart 700 may include triggering a FOTA update campaign for a set of target UE devices 110 (block 710). For example, IoT administration system 170 may send a notification message to each target UE device 110 identifying a FOTA update that is to be scheduled for each target UE device 110. The notification may include information indicating a file size associated with the identified FOTA update and/or a list of IDs for target UE devices 110 for which the identified FOTA update is to be performed.

In responsive to the notification, each target UE device 110 may return a message including an update to its network status and/or its location information (block 720). For example, the network status may indicate a current RRC mode associated with each target UE device 110 and serving base station 130. The location information may indicate a current geographic location of each target UE device 110 based on current global positioning system (GPS) data or other location data. In one implementation, the updated network status information and/or location information may be provided to RAN controller 150. RAN controller 150 may store the information, for example, in base station/FOTA agent DB 340. Based on the updated information, base stations 130 having service coverage areas within which each target UE device 110 are located may be identified from base station/FOTA agent records 400 stored in base station/FOTA agent DB 340.

Process 700 may include selection of an RF beam pattern based on signal quality requirements identified for FOTA update file transmission to each target UE device 100 (block 730). For example, beam pattern selector 380 may use FOTA update file size and other parameters (e.g., UE device 110 type) from FOTA update campaign records 500 and elsewhere to determine the corresponding RF beam characteristics for successfully file transfer to each target UE device 110 while at the same time minimizing interference to non-targeted UE devices 110 operating in the associated service coverage areas. Process 700 may include determining whether the RF signal quality requirements would be met by at least one of the identified base stations 130 (block 740). For example, RF signal quality requirements for an identified timeframe may be compared to a channel quality indicator (CQI) value, a signal to noise ratio (SNR) value, a signal-to-interference-plus-noise ratio (SINR) value, a block error rate (BLER) value, a Received Signal Strength Indication (RSSI) value, a Reference Signal Received Quality (RSRQ) value, a Reference Signal Received Power (RSRP) value, and/or using another measure of signal strength or quality associated with local RF connectivity conditions for each UE device 110. In some implementations, determining whether the RF signal quality requirements would be met by at least one of the identified base stations 130 may further include consideration of current resource availability and/or loading conditions at base station 130 and/or FOTA agent 180.

When a determination is made that one or more of the candidate base stations 130 would provide the RF signal quality needed for executing the FOTA update campaign (block 740—YES), RAN controller 150 may select a designated base station 130 to carry out the FOTA update campaign (block 745). Assume that a determination concludes that none of the candidate base stations 130 would provide the RF signal quality needed for executing the FOTA update campaign (block 740—NO), and RAN controller 150 identifies FOTA update agent 180 that is capable of maintaining RF signal quality during timeframe for execution the FOTA update campaign (block 750). For example, RAN controller 150 may identify FOTA update agent 180 based on base station/FOTA agent records 400 and/or base station/FOTA agent beam pattern records 600. In some embodiments, FOTA update agent 180 may be associated with the one or more base stations 130 and determined to be the closest (i.e., physically and/or logically) FOTA update agent 180 to UE devices 110 and/or to have the best directional resolution. In some embodiments, FOTA update agent 180 may be instantiated, at a MEC for example, and dedicated for the purpose of executing the FOTA update campaign. In other embodiments, FOTA agent may be a portable wireless access point (e.g., small cell) and relocated via a truck roll, for example, to an advantageous site from which a CAT-M1 and/or NB-IoT interface can be established with target UE devices 110, and without physically accessing a customer's premises at which target UE devices 110 are deployed.

FOTA update agent 180 may initiate FOTA update file transfer from IoT administration system 170 to each target UE device 110 using the selected beam pattern (block 770). For example, FOTA update agent 180 may generate and send instructions to each target UE device 100 to begin download of the FOTA update file at a scheduled time of delivery. Upon completion of the FOTA update file transfer, an indication may be sent to FOTA update agent 180 and/or IoT administration system 170 (block 780). Process 700 may include determining whether FOTA update agent 180 was configured for the limited purpose of executing the FOTA update campaign (block 790). If so (block 790—YES), the connection between FOTA update agent 180 and each target UE device 100 may be released (block 792). For example, FOTA update agent 180 may send a connection release message to each target UE device 110. Alternatively (block 790—NO), process 700 may end with IoT administration system 170 and/or each target UE device 110 may inform FOTA update agent 180 of completion of the FOTA update file transfer(block 794).

Figure 8:
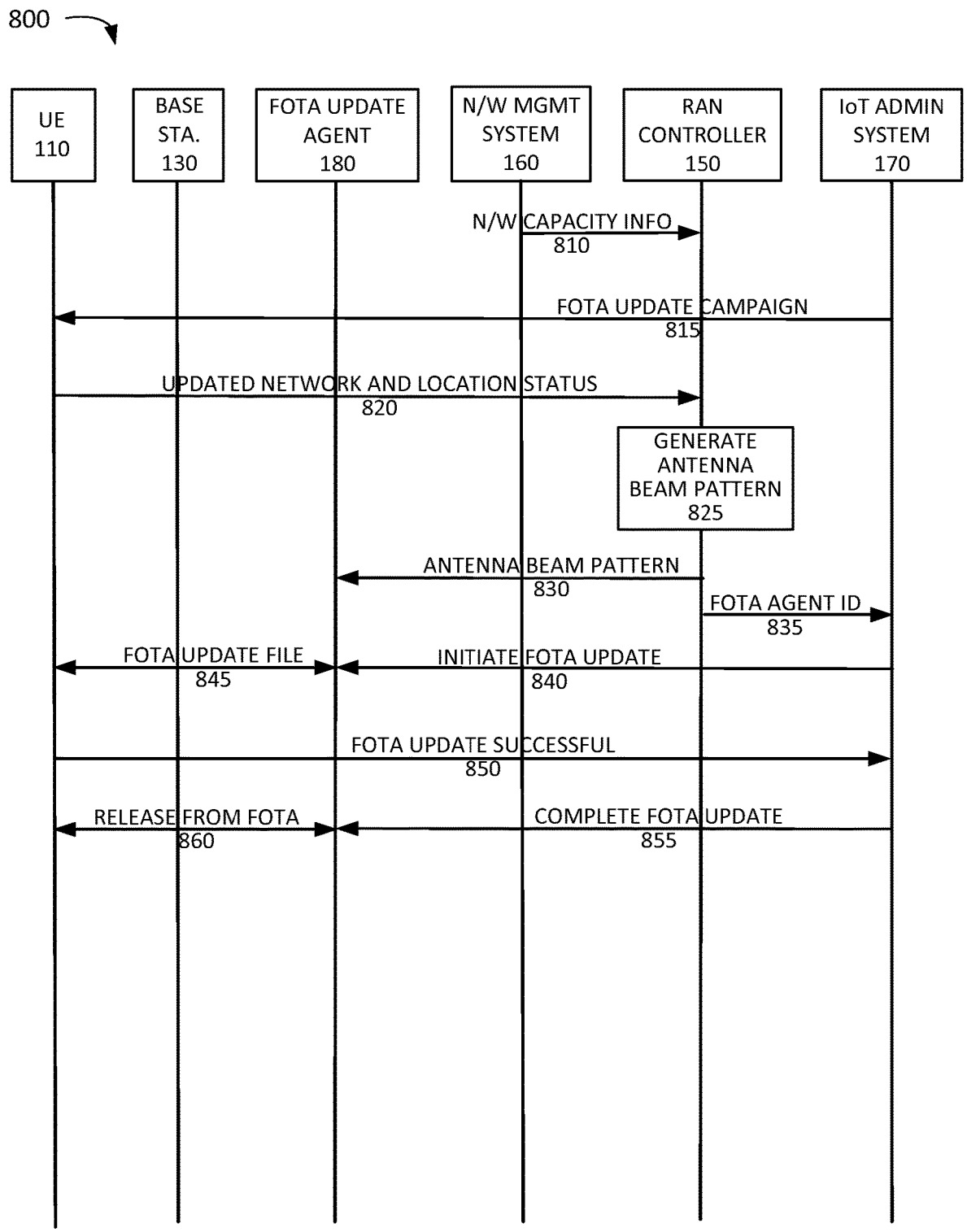
FIG. 8 is a diagram of an exemplary signal flow according to an implementation described herein.

FIG. 8 is a diagram of an exemplary signal flow 800 for executing a FOTA update campaign substantially as described with respect to process 700. As shown in FIG. 8, signal flow 800 may include network management system 160 providing network capacity information for base stations 130 to RAN controller 150 (signal 810). Assume the network capacity information indicates that none of base stations 130 are able to handle identified FOTA updates associated within a FOTA update campaign during a scheduled timeframe (e.g., concurrently).

Thereafter, IoT administration system 170 may trigger a FOTA update campaign for a FOTA update available for target UE devices 110 (signal 815). In response, each target UE device may provide an updated network status and locations information to RAN controller 150 for the FOTA update (signal 820). In some embodiments, the update information may be provided for multiple target UE devices 110 by a single network device, such as a fixed wireless access device.

RAN controller 150 may use the network status update, the location information, FOTA update file size information, and other FOTA update campaign information to generate an antenna beam pattern, including a time of delivery, for delivering the FOTA update file to target UE devices 110 (operation 825). RAN controller 150 may use the antenna beam pattern to select FOTA update agent 180 for executing the FOTA update campaign and send instructions that include the antenna beam pattern to FOTA update agent 180 (signal 830). RAN controller 150 may identify FOTA update agent 180 to IoT administration system 170 (signal 835).

IoT administration system 170 may initiate FOTA update activity by sending a message to the identified FOTA update agent 180 (signal 840). For example, the message may identify the FOTA update campaign, target UE devices 110, and include a FOTA update file. In response, FOTA update agent may transfer the FOTA update file to target UE devices 110 according to the antenna beam pattern and related transmission instructions provided by RAN controller 150 (signal 845). Upon successful transfer, each target UE device 100 may inform IoT administration system 170 of the successful transfer of the FOTA update file (signal 850). In response, IoT administration system 170 may notify FOTA update agent 180 of the completion of the FOTA update campaign (signal 855), and FOTA update agent 180 may then release each target UE device 110 from the connection (signal 860).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signal flows and operations has been described with respect to FIG. 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   identifying, by a radio access network (RAN) controller, transmission information related to a performing of an over-the-air (OTA) update operation, wherein the transmission information identifies a location of targeted user equipment (UE) devices that are to receive an OTA update file via one or multiple serving cells;
   determining, by the RAN controller, that a size of the OTA update file exceeds a threshold file size;
   identifying, by the RAN controller based on the determining and a minimization of interference to non-targeted UE devices served by the one or multiple serving cells, an antenna beam pattern for use in delivering the OTA update file;
   selecting, by the RAN controller and based on the antenna beam pattern, a network device from among candidate network devices for the performing of the OTA update operation;
   receiving, by the network device, the OTA update file;
   physically relocating the network device to a location proximate to a customer premises area in which the targeted UE devices are located, without physically accessing the customer premises area for a duration of the OTA update; and
   transferring, by the network device, the OTA update file to the targeted UE devices according to the transmission information.

2. The method of claim 1, wherein the transmission information further includes a time of delivery for performing the transferring.

3. The method of claim 1, wherein the OTA update operation includes a firmware OTA (FOTA) update operation and wherein the OTA update file includes a FOTA update file.

4. The method of claim 1, wherein the targeted UE devices include at least one of a Category M (Cat-M) Internet of things (IoT) device or a narrow band IoT (NB-IoT) device.

5. The method of claim 1, wherein the network device comprises a dedicated OTA update transceiver that extends network access coverage from one or more base stations to the customer premises area.

6. The method of claim 1, wherein the network device is a portable small cell device, and wherein the customer premises area is determined to have a poor radio frequency profile prior to the physically relocating.

7. The method of claim 5, wherein the dedicated OTA update transceiver is located at a multi-access edge computing (MEC) network that is selected from a plurality of MEC networks based on a proximity to one or more of the targeted UE devices.

8. A system comprising:
   processors configured to:
      identify transmission information related to a performing of an over-the-air (OTA) update operation, wherein the transmission information identifies a location of targeted user equipment (UE) devices that are to receive an OTA update file via one or multiple serving cells;
      determine that a size of the OTA update file exceeds a threshold file size;
      identify, based on the determination and a minimization of interference to non-targeted UE devices served by the one or multiple serving cells, an antenna beam pattern for use in delivering the OTA update file;
      select, based on the antenna beam pattern, a network device from among candidate network devices for the performing of the OTA update;
      receive the OTA update file;
      physically relocate the network device to a location proximate to a customer premises area in which the targeted UE devices are located, without physically accessing the customer premises area for a duration of the OTA update; and
      transfer the OTA update file to the targeted UE devices according to the transmission information.

9. The system of claim 8, wherein the transmission information further includes a time of delivery for performing the transfer.

10. The system of claim 8, wherein the OTA update operation includes a firmware OTA (FOTA) update operation and wherein the OTA update file includes a FOTA update file.

11. The system of claim 8, wherein the targeted UE devices include at least one of a Category M (Cat-M) Internet of things (IoT) device or a narrow band IoT (NB-IoT) device.

12. The system of claim 8, wherein the network device comprises a dedicated OTA update transceiver that extends network access coverage from one or more base stations to the customer premises area.

13. The system of claim 8, wherein the network device is a portable small cell device, and wherein the customer premises area is determined to have a poor radio frequency profile prior to the physically relocating.

14. The system of claim 12, wherein the dedicated OTA update transceiver is located at a multi-access edge computing (MEC) network that is selected from a plurality of MEC networks based on a proximity to one or more of the targeted UE devices.

15. A non-transitory computer-readable memory device storing instructions executable by processors of a system, the non-transitory computer-readable memory device comprising instructions that, when executed cause the system to:
identify transmission information related to a performing of an over-the-air (OTA) update operation, wherein the transmission information identifies a location of targeted user equipment (UE) devices that are to receive an OTA update file via one or multiple serving cells;
determine that a size of the OTA update file exceeds a threshold file size;
identify, based on the determination and a minimization of interference to non-targeted UE devices served by the one or multiple serving cells, an antenna beam pattern for use in delivering the OTA update file;
select, based on the antenna beam pattern, a network device from among candidate network devices for the performing of the OTA update operation;
receive the OTA update file;
physically relocate the network device to a location proximate to a customer premises area in which the targeted UE devices are located, without physically accessing the customer premises area for a duration of the OTA update; and
transfer the OTA update file to the targeted UE devices according to the transmission information.

16. The non-transitory computer-readable memory device of claim 15, wherein the transmission information further includes a time of delivery for performing the transfer.

17. The non-transitory computer-readable memory device of claim 15, wherein the OTA update operation includes a firmware OTA (FOTA) update operation and wherein the OTA update file includes a FOTA update file.

18. The non-transitory computer-readable memory device of claim 15, wherein the targeted UE devices include a Category M (Cat-M) Internet of things (IoT) device or a narrow band IoT (NB-IoT) device.

19. The non-transitory computer-readable memory device of claim 15, wherein the network device comprises a dedicated OTA update transceiver that extends network access coverage from the one or more base stations to the customer premises area.

20. The non-transitory computer-readable memory device of claim 19, wherein the dedicated OTA update transceiver is located at a multi-access edge computing (MEC) network that is selected from a plurality of MEC networks based on a proximity to one or more of the targeted UE devices.

* * * * *